(12) United States Patent
Pal

(10) Patent No.: US 10,150,433 B2
(45) Date of Patent: Dec. 11, 2018

(54) POWER DISTRIBUTION PANEL HAVING CONTACTOR WITH THERMAL MANAGEMENT FEATURE

(71) Applicant: Hamilton Sundstrand Corporation, Charlotte, NC (US)

(72) Inventor: Debabrata Pal, Hoffman Estates, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 546 days.

(21) Appl. No.: 14/752,217

(22) Filed: Jun. 26, 2015

(65) Prior Publication Data
US 2016/0375848 A1 Dec. 29, 2016

(51) Int. Cl.
B60L 1/00 (2006.01)
B60L 3/00 (2006.01)
H02G 3/00 (2006.01)
B60R 16/03 (2006.01)
B60R 16/00 (2006.01)
H01H 9/52 (2006.01)
H01H 50/12 (2006.01)
H02B 1/56 (2006.01)
H01H 50/54 (2006.01)
H02J 1/00 (2006.01)

(52) U.S. Cl.
CPC ............ B60R 16/03 (2013.01); B60R 16/005 (2013.01); H01H 9/52 (2013.01); H01H 50/12 (2013.01); H01H 50/546 (2013.01); H02B 1/56 (2013.01); H02J 1/00 (2013.01)

(58) Field of Classification Search
CPC ........ H02B 1/56; H01H 50/043; H01H 50/12; H01H 50/546; H01H 9/52; B60R 16/005; B60R 16/03
See application file for complete search history.

(56) References Cited

U.S. PATENT DOCUMENTS

| 4,914,551 | A | * | 4/1990 | Anschel | ............. | H01L 23/3675 |
| | | | | | | 257/713 |
| 5,337,214 | A | * | 8/1994 | Lindsey | ............... | H01H 50/047 |
| | | | | | | 174/16.3 |
| 5,991,155 | A | * | 11/1999 | Kobayashi | .......... | H01L 23/3672 |
| | | | | | | 165/80.2 |
| 7,837,496 | B1 | | 11/2010 | Pal | | |

(Continued)

FOREIGN PATENT DOCUMENTS

CN 203674090 U 6/2014
EP 2648198 A1 10/2013

OTHER PUBLICATIONS

European Search Report for European Application No. 16176367.7 dated Oct. 4, 2016.

Primary Examiner — Rexford Barnie
Assistant Examiner — Rasem Mourad
(74) Attorney, Agent, or Firm — Carlson, Gaskey & Olds, P.C.

(57) ABSTRACT

An aircraft power distribution system according to an exemplary aspect of the present disclosure includes, among other things, a power source, a load, and a power distribution panel receiving power from the power source and selectively providing power to the load. The power distribution panel includes a contactor having a housing. A heat sink provides a portion of the housing.

15 Claims, 4 Drawing Sheets

(56) References Cited

U.S. PATENT DOCUMENTS

| | | | |
|---|---|---|---|
| 2007/0076381 A1* | 4/2007 | Han | F21K 9/00 |
| | | | 361/749 |
| 2010/0224985 A1* | 9/2010 | Michael | H01L 23/3114 |
| | | | 257/692 |
| 2011/0193109 A1* | 8/2011 | Loh | F21K 9/30 |
| | | | 257/89 |
| 2013/0206363 A1* | 8/2013 | Kirk | F28F 7/00 |
| | | | 165/84 |
| 2013/0257569 A1* | 10/2013 | Pal | H01H 50/043 |
| | | | 335/202 |
| 2014/0002995 A1* | 1/2014 | Pal | H01H 1/62 |
| | | | 361/712 |
| 2014/0087584 A1 | 3/2014 | Pal | |
| 2014/0334074 A1 | 11/2014 | Pal et al. | |
| 2015/0303016 A1* | 10/2015 | Sprague | H01H 1/06 |
| | | | 335/189 |

* cited by examiner

POWER DISTRIBUTION PANEL HAVING CONTACTOR WITH THERMAL MANAGEMENT FEATURE

BACKGROUND

Aircraft electrical power systems have power distribution panels (sometimes called "power panels") configured to direct power from one or more power sources to one or more loads. Example power sources include generators from engines on an aircraft, batteries, or auxiliary power units (APUs). Example loads include cabin lighting, hydraulic motors, cabin air compressors, or engine electric start motor controller, to name a few.

Power distribution panels include high power contactors operable to selectively direct power between the power sources and the loads. The contactors are individual, replaceable units that mount to a printed wire board (PWB) via terminal posts or pads. The power distribution panel contains current-sensing features and control functions configured selectively to open or close the contactors. Power from the power sources is directed to the power distribution panel by way of feeder cables, which are electrically coupled to bus bars by way of an intermediate connector, known as a lug. The bus bars are electrically coupled to a contactor. When closed, the contactor is configured to direct power to one or more loads.

As power flows through the contactors between the power sources and the loads, the contactors generate significant heat. Contactors are typically cooled by exposure to ambient air. In some case, contactors are supported relative to a printed wire board via first and second contactor posts, which allows air to flow around the contactor.

SUMMARY

An aircraft power distribution system according to an exemplary aspect of the present disclosure includes, among other things, a power source, a load, and a power distribution panel receiving power from the power source and selectively providing power to the load. The power distribution panel includes a contactor having a housing. A heat sink provides a portion of the housing.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows:

In FIG. 2, the contactor is closed.

In FIG. 3, the contactor is open.

DETAILED DESCRIPTION

Figure 1:
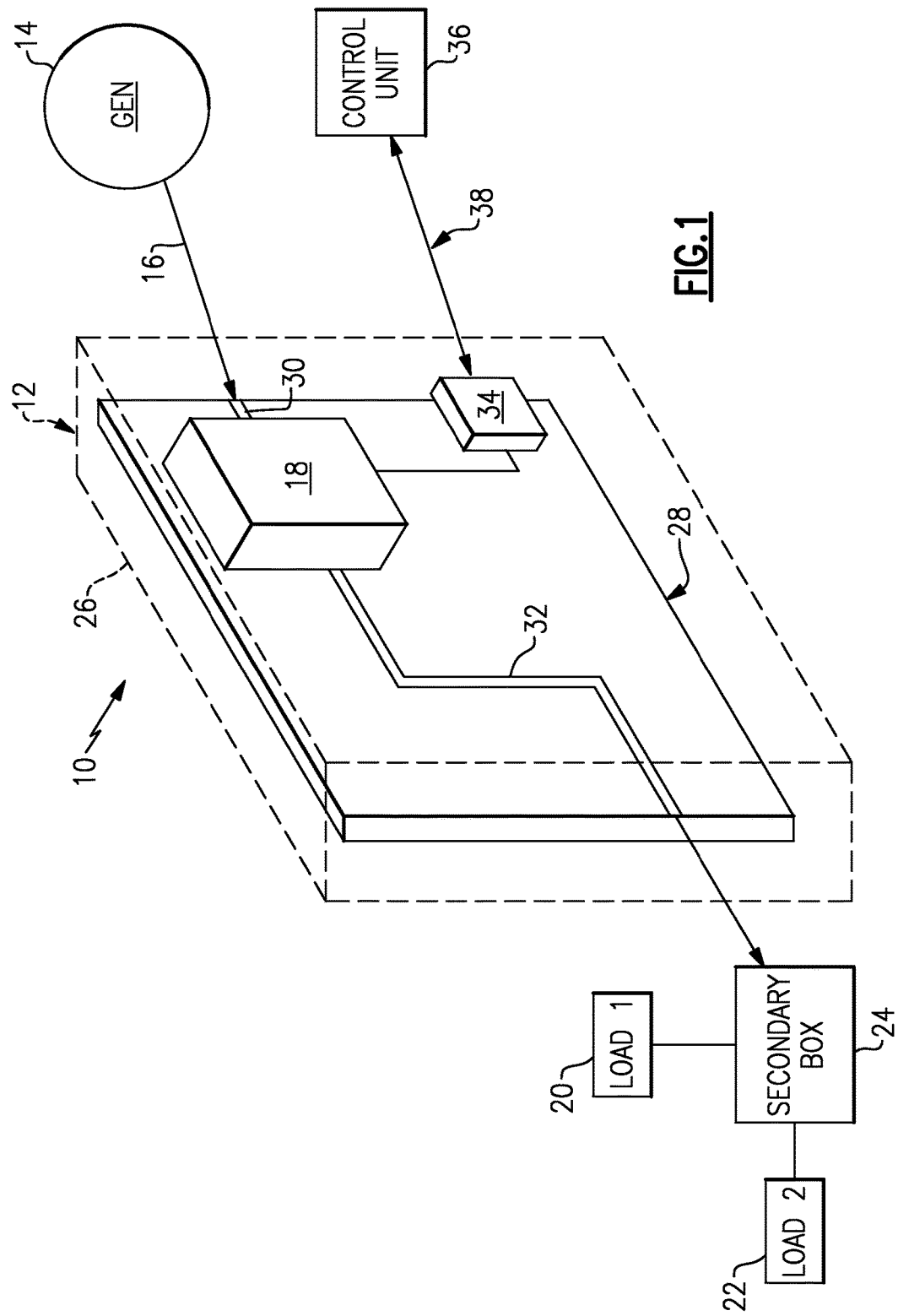
FIG. 1 is a schematic view of an aircraft power distribution system.

An example aircraft power distribution system 10 is schematically illustrated in FIG. 1. The system 10 may be embodied on an aircraft having a cabin and at least one gas turbine engine. The system 10 includes a power distribution panel (again, sometimes called a "power panel") 12 that receives power from a power source 14. Here, the power source 14 is a generator, such as a generator associated with a gas turbine engine of an aircraft.

While only one power source is illustrated, it should be understood that additional power sources come within the scope of this disclosure. In that case, the power distribution panel 12 would be configured to selectively direct power from the multiple power sources to one or more loads. Example power sources include generators on gas turbine engines associated with an aircraft. If a particular aircraft has two engines, there will be two separate power sources, one from each engine. Additional power sources may include batteries, auxiliary power units (APUs), ground power modules, and RAM air turbines, to name a few examples.

The power source 14 is connected to the power distribution panel 12 by way of an electrical connection 16, which will be discussed in detail below. The power distribution panel 12 includes one or more contactors 18 configured to direct power from the power source 14 to one or more loads 20, 22.

In this example, there is one contactor 18 and two loads 20, 22. This disclosure is not limited to power distribution panels having any particular number of contactors or loads. Some example loads include aircraft cabin lighting, hydraulic motors associated with the aircraft, cabin air compressors, and the engine start module. The first and second loads 20, 22 receive power from a secondary power distribution box 24 configured to selectively direct power from the power distribution panel 12 to the first and second loads 20, 22. The secondary power distribution box 24 is not required in all examples.

The power distribution panel 12 includes a housing 26 and a printed wire board (PWB) 28. The contactor 18 is mounted to the PWB 28. In this example, the contactor 18 is electrically coupled to the electrical connection 16 by way of a first bus bar 30, and is connected to the secondary power distribution box 24 by way of a second bus bar 32. The contactor 18 is configured to selectively open and close an electrical connection between the first and second bus bar 30, 32.

The PWB 28 also supports a connector 34 that communicates with a control unit 36 through a harness 38. The control unit 36 may be any known type of controller including memory, hardware, and software. The control unit 36 may be a bus power control unit (BPCU), and may further be in communication with a full authority digital engine control (FADEC). The control unit 36 is configured to store instructions and to provide instructions to various components of the system 10. In particular, the control unit 36 is configured to send signals to the connector 34, which ultimately reach the contactor 18, to open and close the electrical connection between the first and second bus bars 30, 32 to selectively direct power from the power source 14 to the first and second loads 20, 22.

Figure 2:
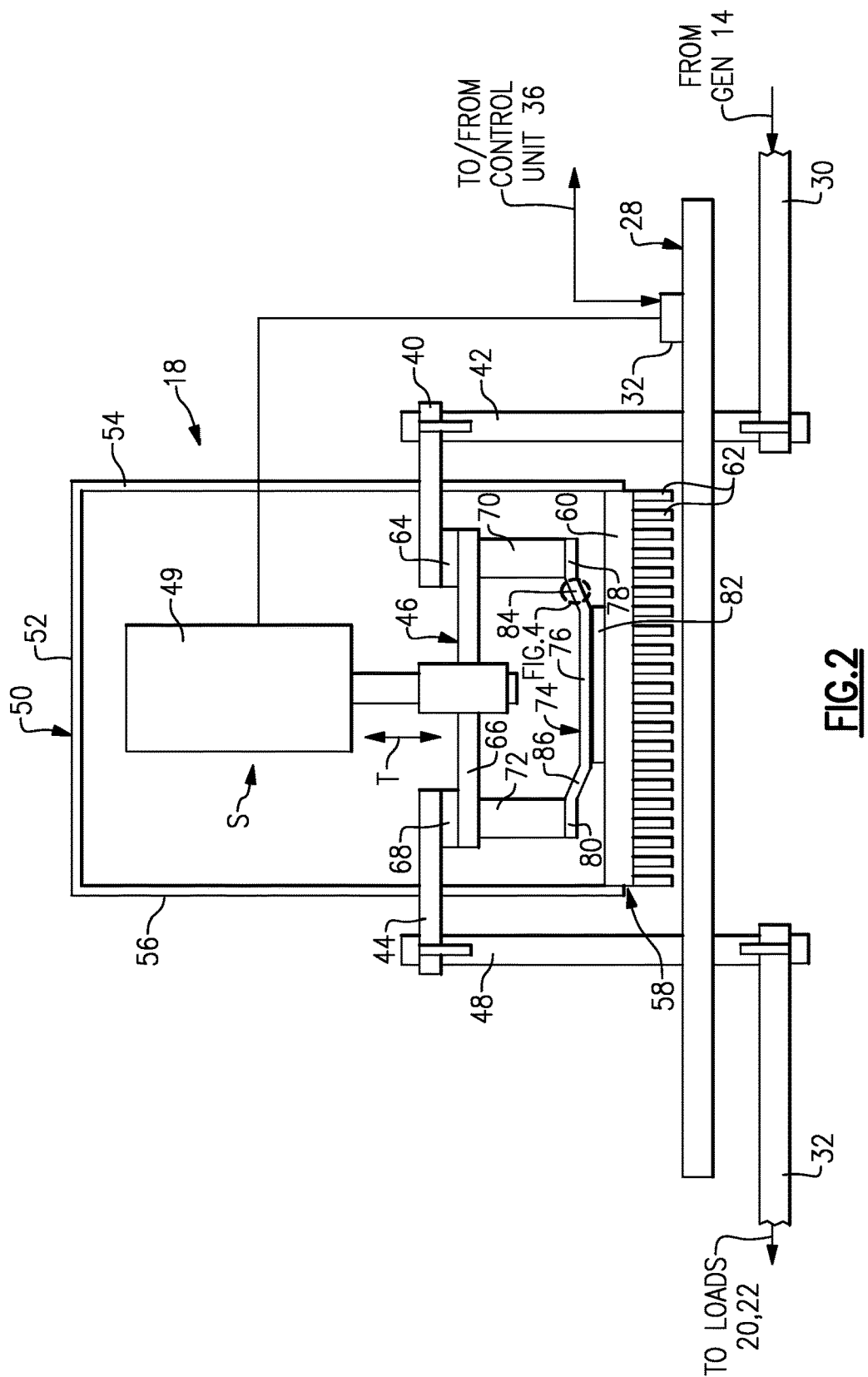
FIG. 2 schematically illustrates an example contactor according to this disclosure.

FIG. 2 schematically illustrates the arrangement of the contactor 18 relative to the PWB 28. FIG. 2 also illustrates the detail of the interior of the contactor 18. In this example, power flows to the first bus bar 30 from the power source 14. From the first bus bar 30, power flows to an input contactor lead 40 by way of a first vertical post 42. The first vertical post 42 is connected to the PWB 28, and is configured to support the contactor 18 relative to the PWB 28.

The input contactor lead 40 is electrically coupled to an output contactor lead 44 by way of switch S. The switch S is provided by a moveable arm 46, which is translatable in a direction T by an electromechanical actuator 49, which may include a solenoid. The electromechanical actuator 49 is electrically coupled to connector 34, and is responsive to instructions from the control unit 36.

The output contactor lead 44 is connected to the second bus bar 32 by way of a second vertical post 48, which is also connected to the PWB 28. Together with the first vertical post 42, the second vertical post 48 supports the contactor 18 above the PWB 28 to allow air to flow around the contactor 18.

The contactor 18 includes an exterior housing 50. The housing 50 includes a top 52 and sides 54, 56 (only two sides shown in FIG. 2). In this example, the bottom of the housing 50 is provided by a heat exchanger 58, which spans between the sides 54, 56. The heat exchanger 58 is rigidly connected to the sides 54, 56 in this example, and is not configured to move during normal use. The heat exchanger 58 may be formed separately from the remainder of the housing 50, and then attached between the sides 54, 56. Alternatively, the heat exchanger 58 may be integrally formed with the housing 50. The heat exchanger 58 includes a base 60 and a plurality of fins 62 projecting outwardly, relative to the housing 50 and, in this example, toward the PWB 28.

In FIG. 2, the contactor 18 is closed. In particular, the input contactor lead 40 is electrically coupled to the output contactor lead 44 by way of the moveable arm 46. Specifically, in this example, a contact pad 64 of the input contactor lead 40 directly contacts a contact portion 66 of the moveable arm 46. The moveable arm 46 is also in direct contact with a contact pad 68 of the output contactor lead 44. The contact pads 64, 68 are not required in all examples.

On an opposite side of the contact pads 64, 68, the moveable arm 46 includes first and second heat sink posts 70, 72. The heat sink posts 70, 72 are connected to a flexible heat spreader 74 having a base section 76 and post connection sections 78, 80, each of which are connected to a corresponding one of the heat sink posts 70, 72. The base section 76 of the flexible heat spreader 74 is connected to the base 60 of the heat exchanger 58 on an opposite side of the fins 62. In this example, a layer 82 of insulation material is provided between the base section 76 and the base 60. The flexible heat spreader 74 transfers heat from the moveable arm 46 to the heat exchanger 58, which reduces the temperature of the contactor 18 during operation.

The flexible heat spreader 74 includes arms 84, 86 between the base section 76 and the post connection sections 78, 80. In this example, the arms 84, 86 are inclined an angle greater than zero and less than one-hundred-and-eighty degrees relative to the base section 76, which is substantially horizontal (when viewed in the orientation of FIGS. 2-3). The arms 84, 86 form an obtuse angle between an upper surface of a respective arm 84, 86 and the upper surface of the base section 76. In other words, when viewed in the orientation of FIGS. 2-3, the arms 84, 86 are inclined such that they have both a vertical component (parallel to the direction T) and a horizontal component (perpendicular to the direction T). The arms 84, 86 can be manipulated as the moveable arm 46 translates in the direction T. To this end, the flexible heat spreader 74 is provided by a material that is flexible as well as electrically insulative and thermally conductive. One example material is anodized aluminum (Al), such as ANO-FOL, discussed below.

Figure 3:
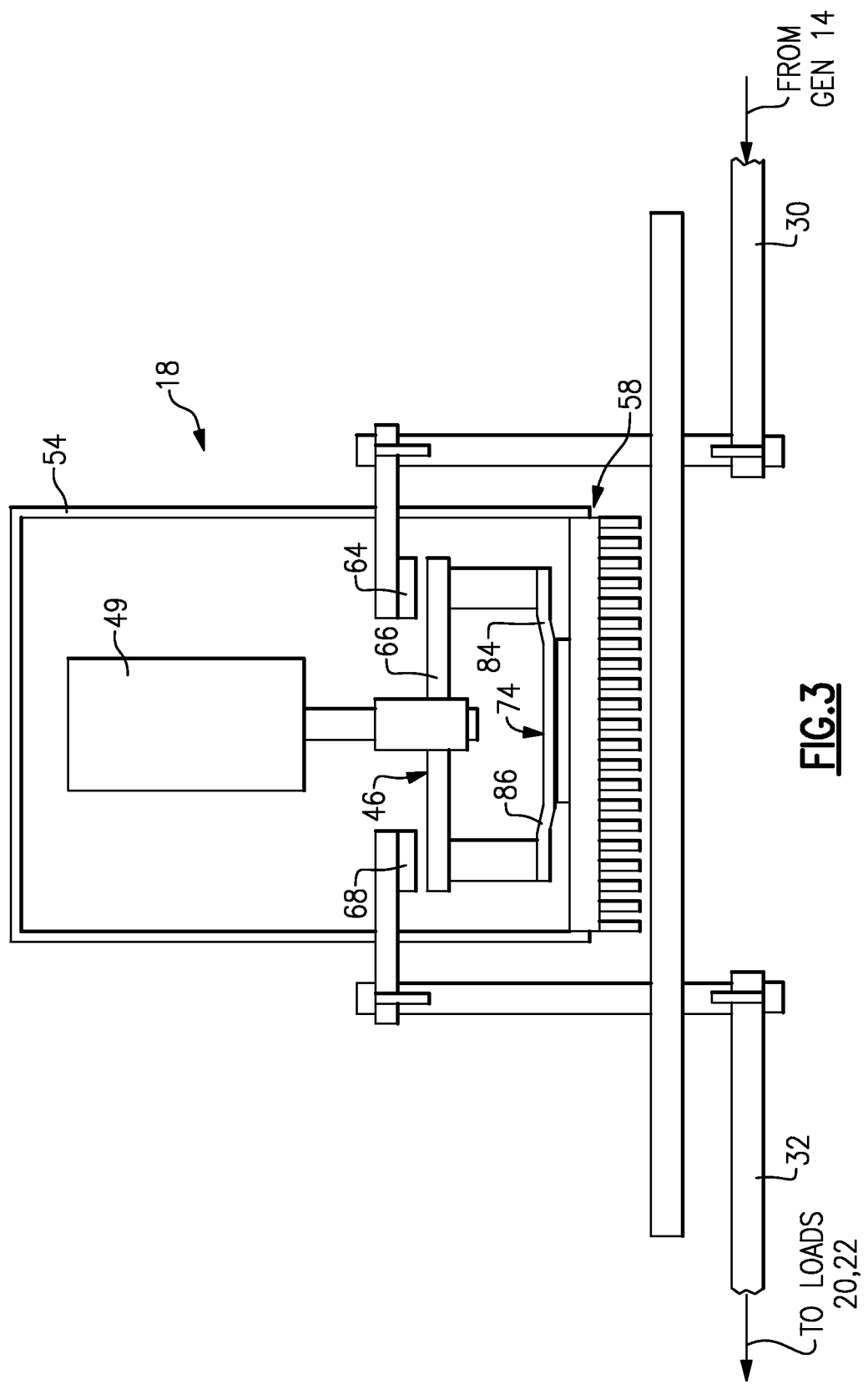
FIG. 3 illustrates the contactor of FIG. 2.

FIG. 3 illustrates the contactor 18 in an open position. In the open position, the contact portion 66 of the moveable arm 46 is vertically-spaced from the first and second pads 64, 68. The electromechanical actuator 49 effected this change by moving the moveable arm 46 in the downward direction (the term "downward" is used relative to the orientation of FIGS. 2-3). In this example, the only structures that move are the electromechanical actuator 49, the moveable arm 46, and the flexible heat spreader 74.

Figure 4:
FIG. 4 is a close-up view of the encircled area in FIG. 2 and shows the detail of an example heat spreader.
Figure 5:
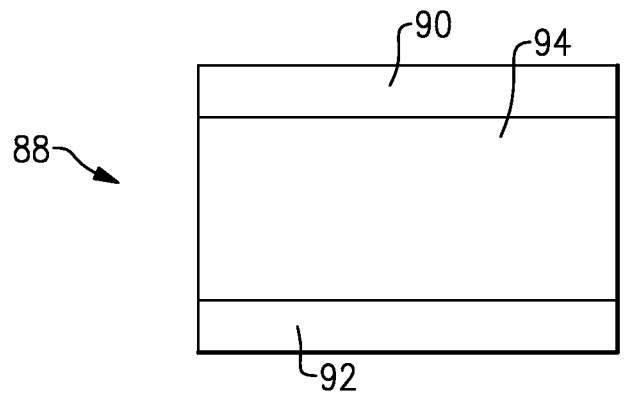
FIG. 5 illustrates a single layer of the heat spreader of FIG. 4.

Turning to FIG. 4, which is a close-up view of the flexible heat spreader 74, the flexible heat spreader 74 may be provided by multiple layers 88 of anodized aluminum (Al), such as ANO-FOL, connected by an adhesive. A single layer 88 is illustrated in FIG. 5. Each layer 88 includes first and second opposed exterior layers 90, which are provided by an oxide, and an interior layer 94, which is provided by aluminum (Al). The interior layer 94 provides good thermally conductive properties. The exterior layers 90, 92 provide good electrical resistance. In general, the layers 88 are flexible.

The interior layer 94, in one example, is substantially more thick than the exterior layers 90, 92. More particularly, in one example, the interior layer 94 is at least 30 times more thick than the exterior layers 90, 92. In one example, each exterior layer 90, 92 is about 2.5 microns thick (about 0.0001 inches) and the thickness of the interior layer 94 is about 95 microns (about 0.0037 inches). In that example, each layer 88 is about 100 microns (about 0.0039 inches). In one example, the flexible heat spreader 74 is provided by between 25 and 75 of the layers 88. In one particular example, the flexible heat spreader 74 is provided by 50 layers 88 and has a thickness of about 5,000 microns (about 0.2 inches). The disclosed flexible heat spreader 74 provides relatively high electrical resistance, relatively high thermal conductance, and is relatively flexible to facilitate movement of the moveable arm 46.

It should be understood that terms such as "generally," "substantially," and "about" are not intended to be boundaryless terms, and should be interpreted consistent with the way one skilled in the art would interpret the term.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An aircraft power distribution system, comprising:
a power source;
a load; and
a power distribution panel receiving power from the power source and selectively providing power to the load, wherein the power distribution panel includes a contactor having a housing, wherein a heat sink provides a portion of the housing;
wherein the contactor includes a switch having a moveable arm, the moveable arm having a contact portion configured to close an electrical connection between the power source and the load by contacting an input contactor lead and an output contactor lead;
wherein the moveable arm includes at least one heat sink post projecting from the contact portion;

wherein the contactor includes a flexible spreader having a post connection section connected to the at least one heat sink post, and a base section adjacent a base of the heat sink; and wherein the flexible spreader includes a flexible arm between the base section and the post connection section.

2. The system as recited in claim 1, wherein the flexible arm is inclined an angle greater than zero and less than one-hundred-and-eighty degrees relative to the base section.

3. The system as recited in claim 1, wherein the flexible spreader is provided by a plurality of layers of anodized aluminum (Al).

4. The system as recited in claim 3, wherein the layers of anodized aluminum (Al) include an interior layer of aluminum (Al) and opposed exterior layers of oxide.

5. The system as recited in claim 4, wherein the interior layer has a thickness at least 30 times greater than the thickness of the exterior layers.

6. The system as recited in claim 5, wherein the flexible spreader is provided by between 25 and 75 of the layers of anodized aluminum (Al).

7. The system as recited in claim 1, wherein the heat sink includes fins projecting outward relative to the housing.

8. The system as recited in claim 1, wherein:
the power source includes one of a generator of a gas turbine engine, a battery, an auxiliary power unit (APU), a ground power module, and a RAM air turbine; and
the load includes one of aircraft cabin lighting, a hydraulic motor, a cabin air compressor, and an engine electric start motor controller.

9. A contactor for a power distribution panel, comprising:
an exterior housing; and
a heat sink providing a portion of the exterior housing;
the contactor includes a switch having a moveable arm, the moveable arm having a horizontal portion configured to close an electrical connection between a power source and a load by contacting an input contactor lead and an output contactor lead;
the moveable arm includes at least one heat sink post projecting from the horizontal portion; and the contactor includes a flexible spreader having a post connection section connected to the at least one heat sink post, and a base section adjacent a base of the heat sink; and wherein the flexible spreader includes a flexible arm between the base section and the post connection section.

10. The contactor as recited in claim 9, wherein the heat sink includes fins projecting outward relative to the housing.

11. A contactor for a power distribution panel, comprising:
a housing provided in part by a heat sink;
an input contactor lead;
an output contactor lead;
a switch selectively moveable to open and close an electrical connection between the input and output contactor leads;
a flexible spreader provided adjacent the heat sink, wherein a shape of the flexible spreader is manipulated as the switch moves to open and close the electrical connection;
wherein the switch has a moveable arm, and wherein the moveable arm includes at least one heat sink post projecting from a contact portion; and
wherein the flexible spreader has a post connection section connected to the at least one heat sink post, and a base section adjacent a base of the heat sink.

12. The contactor as recited in claim 11, wherein the flexible spreader includes a flexible arm between the base section and the post connection section.

13. The contactor as recited in claim 12, wherein the flexible arm is inclined an angle greater than zero and less than one-hundred-and-eighty degrees relative to the base section.

14. The contactor as recited in claim 9, wherein the heat sink includes a base and fins projecting from the base, and wherein the exterior housing includes a top and sides, the top and sides integrally formed with one another, and wherein the base of the heat sink is attached to the sides to provide a bottom of the exterior housing.

15. The contactor as recited in claim 11, wherein the flexible spreader is configured to transfer heat to the heat exchanger when the switch is in both the open position and the closed position.

\* \* \* \* \*